United States Patent [19]

Engebretsen et al.

[11] Patent Number: 5,860,138

[45] Date of Patent: Jan. 12, 1999

[54] PROCESSOR WITH COMPILER-ALLOCATED, VARIABLE LENGTH INTERMEDIATE STORAGE

[75] Inventors: David Robert Engebretsen, Denmark, Wis.; Steven Lee Gregor, Endicott; Mayan Moudgill, Ossining, both of N.Y.; John Christopher Willis, Rochester, Minn.

[73] Assignee: International Business Machines Corporation, Armonk, N.Y.

[21] Appl. No.: 537,556

[22] Filed: Oct. 2, 1995

[51] Int. Cl.$^6$ .............................. G06F 9/26; G06F 12/02

[52] U.S. Cl. .............................. 711/202; 711/203; 711/3; 711/118; 711/125

[58] Field of Search .................................... 395/410, 403, 395/428, 465, 487, 490, 440; 711/200, 202, 203, 3, 118, 122, 113, 125, 160

[56] References Cited

U.S. PATENT DOCUMENTS

| | | | |
|---|---|---|---|
| 5,107,418 | 4/1992 | Cramer et al. | 395/709 |
| 5,159,678 | 10/1992 | Wengelski et al. | 395/480 |
| 5,179,702 | 1/1993 | Spix et al. | 395/672 |
| 5,202,975 | 4/1993 | Rasbold et al. | 395/385 |
| 5,287,508 | 2/1994 | Hejna, Jr. et al. | 395/372 |
| 5,307,478 | 4/1994 | Rasbold et al. | 395/500 |
| 5,347,642 | 9/1994 | Barratt | 395/440 |
| 5,418,927 | 5/1995 | Chang et al. | 395/490 |
| 5,535,390 | 7/1996 | Hildebrandt | 395/700 |
| 5,566,324 | 10/1996 | Kass | 395/487 |

FOREIGN PATENT DOCUMENTS

| | | | |
|---|---|---|---|
| 2050828 | 9/1991 | Canada | G06F 9/46 |
| PCT/US94/ 04869 | 5/1994 | WIPO | G06F 9/38 |

OTHER PUBLICATIONS

Gurindar S. Sohi, "The Use of Intermediate Memories for Low–Latency Memory Access in Supercomputer Scalar Units", *The Journal of Supercomputing*, Kluwer Academic Publishers, 1990.

H. Dietz and C. Chi, "Cregs: A New Kind of Memory for Referencing Arrays and Pointers", *Proceedings of Supercomputing '88*, IEEE Computer Society Press, Nov. 1988.

Ben Heggy and Mary Lou Soffa, "Architectural Support for Register Allocation in the Presence of Aliasing", *Proceedigns of Supercomputing '90*, IEEE Computer Society Press, 1990.

H. H. J. Hum and G.R. Gao, "A Novel High–Speed Memory Organization for Fine–Grain Muilti–Thread Computing", *PARLE '91*, 1991.

Craig Hyatt, "A High–Performance Object–Oriented Memory", *Computer Architecture News*, vol. 21, No. 4, Sep. 1993.

*Primary Examiner*—Eddie P. Chan
*Assistant Examiner*—Than V. Nguyen
*Attorney, Agent, or Firm*—Baker, Maxham, Jester & Meador; David A. Hall

[57] ABSTRACT

A processor includes an alias unit having high-speed memory storage locations allocated at compile time for variable-sized data objects. The storage locations are accessed through a table of alias entries that consist of a base address in the processor memory to which the alias entry is aliased, the number of bytes in the alias entry, and a base address that points to the first byte of alias buffer memory representing the value of the alias entry. Each alias entry is given a unique name from a small name space that is encoded into relevant machine opcodes. The names are used to reference the data objects. The processor can optionally include a data cache and can be used in either single processor or multi-tasking environments. Reference to a memory location address associated with an alias register entry would be redirected to the intermediate storage.

37 Claims, 9 Drawing Sheets

PROCESSOR WITH COMPILER-ALLOCATED, VARIABLE LENGTH INTERMEDIATE STORAGE

BACKGROUND OF THE INVENTION

1. Field of the Invention

This invention relates generally to computer processors and, more particularly, to computer processors with buffer storage between the processor core and main memory.

2. Description of the Related Art

Computer processors execute machine instructions specified by operation codes, generally referred to as "opcodes", and operands to carry out programming steps specified by a compiler or assembler. Frequently, the machine instruction references one or more data values that are used as the operand in an arithmetic operation, a memory transfer operation, a branch instruction to another machine instruction, and the like. Typically, the referenced data value can be found in either memory (perhaps buffered by intermediate storage such as a cache) or in addressable registers. Each type of data storage has benefits and drawbacks.

Memory locations are accessed by specifying a memory location address where a data value is stored. Memory locations are useful for storing large blocks of data and numerically large data values and are compatible with a variety of addressing schemes. Memory locations are especially useful for accommodating variable data record storage requirements. That is processors often must access data records that comprise collections of objects of varying length. With memory locations, data objects of varying length are simply referenced by the corresponding memory addresses.

Although memory locations provide great flexibility, the access times for memory locations are among the slowest within the memory hierarchy and are not particularly stable from access operation to access operation. The variation in access time is due primarily to the way in which spatial and temporal locality within the address reference sequence (trace) interacts with any caching, interconnect, and memory banking organizations present within the processor. Finally, a relatively large number of bits can be required to encode memory location references because the memory location addresses can be quite lengthy. For example, the result of an effective address computation is thirty-two bits or more for most modern processors, compared with three to five bits typically used to designate a register.

Registers access data much faster as compared to memory locations. This is due in part to the hardware design of the logic gates that implement registers. The fast access time also is due in part to the simplified addressing scheme of registers. Typically, registers are referenced by a short register name. In this way, the entire contents of a thirty-two bit register might be accessed using only the bits required for the opcode and a four-bit name character.

Unfortunately, registers are more expensive to provide in a processor than are memory locations, again because of the hardware design and logic circuitry. Therefore, most processors have a limited number of registers. In addition, the number of registers is limited by the register addressing scheme, which is restricted but highly efficient. Finally, some values cannot be kept in registers because of what is known as the ambiguous reference problem. The ambiguous reference problem occurs when a variable, such as a cell in an array or a pointer, can be known by more than one name. For example, if a sequence of machine instructions refers to two names called x and y, and if one of them is a data value and the other is a pointer, or if both are cells in an array, then both x and y might refer to the same data object, although they appear to reference two different objects. Thus, one name is really an alias for the other.

At compile time, if a compiler can distinguish between the two names, then the data objects x and y can be kept in two different registers. On the other hand, if the compiler can determine that the two names always refer to the same data object, then both names can be mapped to the same register. If the compiler cannot determine if the two names either always or never refer to the same object, then x and y are said to be ambiguously referenced, or related, to each other. If two names are ambiguously referenced to each other, then generally they cannot be kept in registers for any length of time.

A data cache is a small, relatively high-speed memory containing copies of values addressed associatively by main memory addresses. If an instruction references a memory location, the data cache can be checked to determine if the referenced memory location is mapped into the data cache. If it is, then the referenced value is contained in the data cache and there is no need to go to the memory to obtain the value.

Recently, cache-registers (generally called "C-registers" or "C-regs") have been proposed that can be addressed in register-like fashion with short names. Thus, an opcode might specify a C-reg store into "0", which would result in a store operation into the cache register numbered zero. As with conventional registers, such a reference is much more efficient than specifying an entire memory address location. Unlike conventional registers, however, C-regs can be used even if two data object names are ambiguously aliased to each other. Each C-reg holds both an address and a data value. When a C-reg is referenced, an associative search is made by appropriate processor blocks to find neighboring C-regs that have the same address in their address field. Any C-regs found in this way are alternative names for the directly named C-reg, and the C-reg hardware simply maintains coherence of such entries. Unfortunately, C-regs provide only fixed length storage, like conventional registers, and therefore are not as compatible with varying data record storage requirements as memory locations.

From the discussion above, it should be apparent that there is a need for a processor that permits addressing data records with greater efficiency than memory locations and with more deterministic access times, eliminates the ambiguous reference problem, and provides greater storage flexibility than the fixed length storage of conventional hardware registers and cache registers. The present invention satisfies this need.

SUMMARY OF THE INVENTION

In accordance with the invention, a processor includes intermediate storage that can be allocated prior to run time for variable-sized data objects. The processor can optionally include a data cache and can be used in either single processor or multi-tasking environments. The intermediate storage is generally called an alias unit and is provided as a block of relatively high-speed memory storage locations that are accessed through a table of alias entries. Each alias entry includes an address in the processor memory to which the alias entry is aliased, the number of bytes in the alias entry value, and a base address that points to the first byte of alias buffer memory representing the value of the alias entry. Each alias entry is given a unique name from a small name space that is encoded into relevant machine instructions. The names are used to reference data objects. The machine instructions supported by the processor include the explicit communication of an alias buffer memory base address. That is, explicit instructions provide for configuring an alias register entry as well as loading or storing values referenced by the entry. In this way, a compiler can allocate as much of the intermediate storage for its purposes as it deems proper.

The processor instruction set supported by the processor can include allocation and initialization of alias entries, loading and storing between processor registers and alias entries, as well as loading and storing between registers and memory locations that happen to be present in alias entries. Reference to a memory location address associated with an alias entry is redirected to the alias unit buffer memory. Direct addressing and effective addressing schemes also can be supported. A compiler designed for use with the processor of the invention can thereby allocate intermediate storage for frequently referenced data records prior to run time. This increases the operating efficiency of the processor system.

Other features and advantages of the present invention should be apparent from the following description of the preferred embodiment, which illustrates, by way of example, the principles of the invention.

DESCRIPTION OF THE PREFERRED EMBODIMENT

Figure 1:
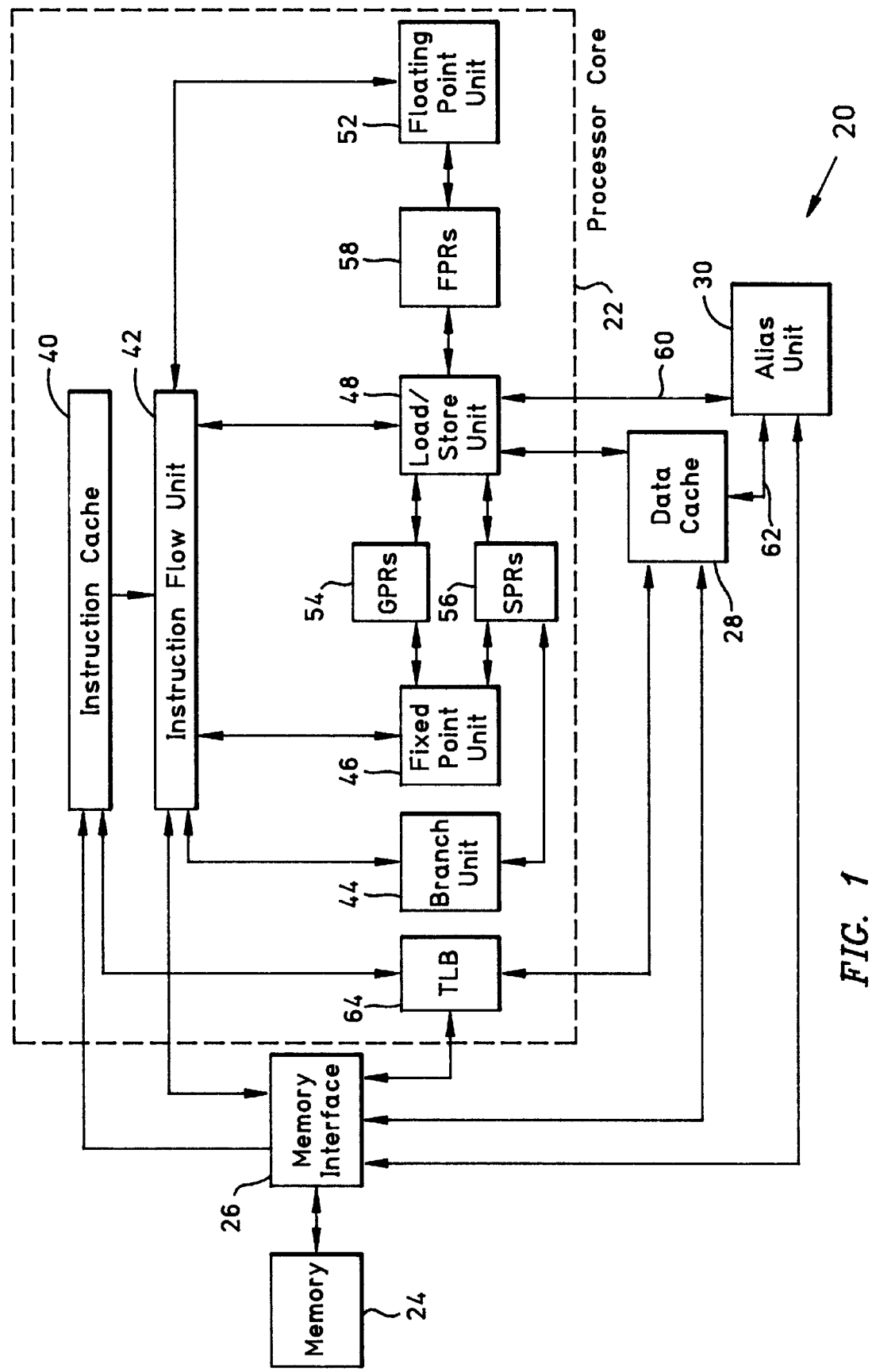
FIG. 1 is block diagram representation of a processor constructed in accordance with the present invention.

FIG. 1 shows a computer processing system 20 constructed in accordance with the present invention. In the preferred embodiment, the computer processing system is a single integrated circuit, superscalar microprocessor implemented utilizing any well-known superscalar microprocessor system, such as the "Power PC" microprocessor manufactured by International Business Machines Corporation (IBM Corporation). It should be noted, however, that the invention can be implemented in multiple integrated circuit chip or single chip designs and in superscalar or non-superscalar processor designs. The processing system 20 includes a processor core 22, a memory unit 24 that interfaces with the processor core through a memory interface unit 26, a data cache 28, and an alias unit 30. The alias unit provides a type of intermediate storage comprising relatively high-speed data storage locations that are accessed through a table of alias entries. The alias entries associate an address in the memory unit 24 with a variable-length block of the alias unit storage locations. That is memory unit storage locations have an "alias" value maintained at a storage location in the alias unit 30.

A compiler utilizing the processor 20 can specify the associations and allocate variable length blocks of the storage locations for the associations prior to run time. The alias unit storage locations can be referenced by a unique name, in much the same way a register is referenced by a register number, and also can be referenced directly by the associated memory unit address. In this way, the alias unit provides efficient access to aliased data objects with the efficient addressing scheme of registers and the deterministic latency of a data cache hit, reduces the load and store traffic otherwise generated in a processor without a data cache, and permits use of compile time information to maximize use of the data storage.

An alias entry includes an address value in the memory unit 24 to which the entry is aliased, a byte length that defines the size of the associated alias record, and a pointer to a base address specifying the first byte of memory in the alias unit 30 storage at which the alias value is stored. A reference to a memory unit address location associated with an alias entry is automatically redirected by the processor to the value in the alias unit for the length specified. That is, an alias entry refers to a memory address interval between the memory address value specified in the alias entry and the sum of the memory address and the byte length size minus one. Subtraction occurs because memory address offsets start at zero, so that the byte length must be reduced by one to obtain the ending memory address in the alias interval. Thus, the alias entries reference a variable length group of storage locations that permit efficient addressing of the group. The processor 20 includes explicit instruction set support for allocating, loading, and storing values referenced by the alias entries. In this way, an entire block of address locations can be addressed with a single machine instruction.

The processor 20 has particular utility in a multi-threaded operating environment, in which the processor can make the decision not to provide an instruction that triggers commutation (also called context switching) between threads as soon as the processor core determines that all references made by an instruction can be satisfied by operands in registers or alias entries. Without the alias unit, the context switching decision must be deferred until the data cache determines that the desired memory location is or is not in the cache. Context switching might occur if the value is not in the cache. The early decision-making made possible by the processor of the present invention simplifies multiple thread context switching and provides improved access by multiple processing threads to the same data objects, in this way, the present invention improves the performance of context switching.

The alias unit 30 provides relatively high-speed access to the storage locations of the alias unit buffer memory and therefore some of the benefits of conventional register architecture are obtained. That is, the access time is consistent and relatively quick, and far fewer bits are required to encode an alias unit reference than a memory address reference. The alias unit entries are not susceptible to the ambiguous reference problem, however, and therefore share a benefit of cache register architecture. In addition, variable-size data records are more easily and efficiently referenced than is possible with machine instructions using either register, cache, or memory address locations. Thus, the alias unit entries provide variable length storage specified on an abbreviated name basis and do not have the fixed-length storage limitations of cache registers.

Figure 2:
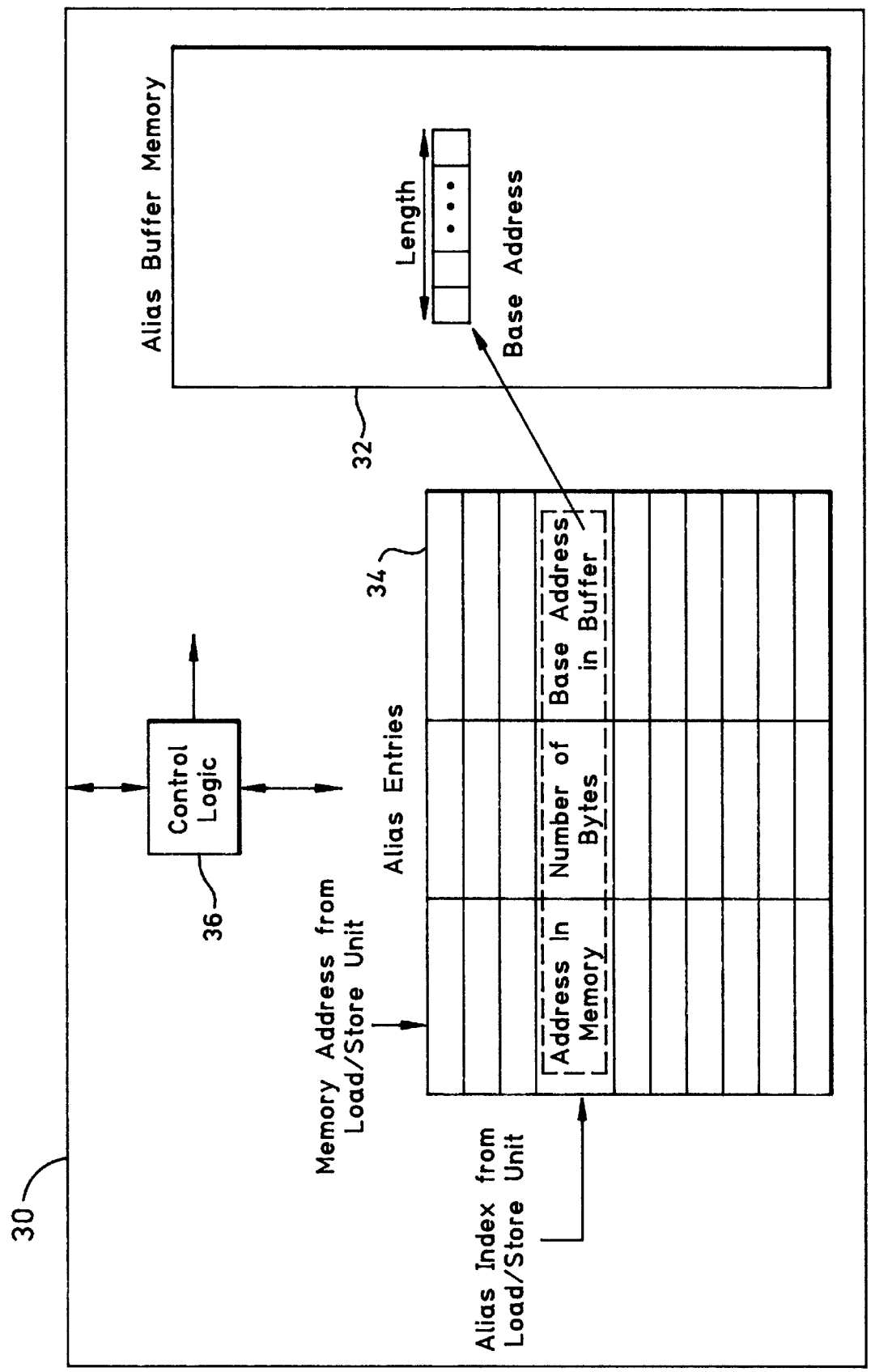
FIG. 2 is a block diagram representation of the alias unit illustrated in FIG. 1.

FIG. 2 is a block diagram showing that the alias unit 30 comprises a group of storage locations referred to as the alias buffer memory 32, a table of alias entries 34, and alias control logic 36 that controls utilization of the buffer memory and alias entry table. Each alias entry consists of an address in the memory unit 24 to which the entry is aliased, the number of bytes in the associated alias buffer memory 32, and a base address that points to the first byte of memory in the alias buffer memory at which the value of the alias entry is stored. As noted above, one of the ways each alias entry can be referenced is by a unique name selected from a small name space that is encoded into relevant machine instructions, in much the same manner that addressable registers are referenced.

For example, each alias entry of interest might be referenced in assembly language programming code by the letter "A" followed by a number. An assembly language instruction reference to "A0" therefore would be directed by the control logic 36 to the first alias entry in the table 34. An instruction reference to "A1" would be directed to the second alias entry, an instruction reference to "A2" to the third alias entry, and so on. Typically, the alias unit 30 can accommodate at least two alias entries in the table 34 but not more than two hundred fifty-six. The alias buffer memory can be much larger, for example it might have a capacity of sixteen kilobytes (16 KB) of storage or 32 KB. The alias entry names provide an easy way to reference data objects. Explicit instructions described further below provide for configuring an alias entry as well as loading and storing values referenced by the entry.

Returning to FIG. 1, the preferred embodiment includes within the processor core 22 an instruction cache 40 and an instruction flow unit 42. The instruction flow unit receives instructions from the instruction cache and controls the execution of processes associated with the processing system 20 in a manner known to those skilled in the art. The processing system, if desired, can support a multi-tasking environment that controls the execution of multiple processing threads. The instruction flow unit 42 selectively provides machine instructions to execution circuitry of the processor core 22, such execution circuitry including a branch unit 44, a fixed point arithmetic unit 46, a load/store unit 48, and a floating point arithmetic unit 52. The processor core also includes circuitry that implements a set of general purpose registers (GPR) 54, special purpose registers (SPR) 56, and floating point registers (FPR) 58. The registers provide operands to the execution circuitry of the processor core. The special purpose registers can be used to store processor state information in conjunction with thread switching in a multi-tasking mode of operation.

The alias unit 30 receives alias register instructions from the load/store unit 48 over a processor core interface bus 60 and provides the load/store unit with information concerning alias entry hits and misses. That is, the alias unit will return a data value for an alias entry reference found in the alias buffer memory 32 (FIG. 2) and otherwise will return an indication of a failed attempt to reference a value not found in the alias entries. The alias unit 30 also communicates with the data cache 28 over a cache-alias unit bus 62 for greater efficiency in performing effective address storing of data values, also called indirect addressing. That is, in response to an instruction memory reference via an effective address, the load/store unit 48 simultaneously provides the machine instruction to both the data cache 28 and the alias unit 30. As soon as the referenced operand is located in either one of these intermediate storage elements, the other is informed so it does not communicate with the memory interface 26 to fetch the referenced data, which would be unnecessary. This preemption of memory interface fetching is important because, once begun, memory interface fetching is difficult to halt.

The preferred embodiment of a processor constructed in accordance with the invention also includes a special purpose buffer called a transition look-aside buffer (TLB) 64 that contains virtual-to-real-address mapping. Thus, the TLB can improve the speed of accessing data stored in virtual memory locations. The TLB does not affect the operation of the processor from the perspective of the alias unit 30. Those skilled in the art will understand how to implement the TLB without further explanation.

The alias unit 30 can be used with an efficient compiler design, for example, to contain data records that have been allocated prior to run time and for which the compiler expects to have repeated requests for access. The compiler would generate instructions that in turn reference an entire data record or a selected part of the data record with a single reference to an alias entry name and an offset. Because of the variable length storage specification, such a compiler can choose to overlap the storage locations assigned to distinct alias entries within the alias storage if the compiler can ensure that actual references to selected parts of the data record will not destructively overlap during the lifetime of the alias entry. In this way, two data object names can be associated, or aliased to each other, before run time. This improves the efficiency of compiler-generated machine code.

The table of alias entries 34 illustrated in FIG. 2 preferably is implemented in hardware with an architecture similar to that used for the other processor registers illustrated in FIG. 1. Thus, the access time for retrieving alias entries will be much quicker than for retrieving data from storage locations in the memory unit 24. The circuitry for the alias unit 30 therefore can be implemented using conventional integrated circuit fabrication techniques. The design of the processor system 20 therefore will necessarily incorporate a maximum number of alias entries that are available. A compiler, however, need not allocate all of the alias entries available to it.

As noted above, the processor 20 includes explicit instruction set architecture support for allocating, loading, and storing values referenced by the alias entries. The operation of the processor will be better understood with reference to the flow diagrams of FIGS. 3–8, which illustrate the processing steps carried out by the processor in executing exemplary alias unit instruction set opcodes.

Figure 3:
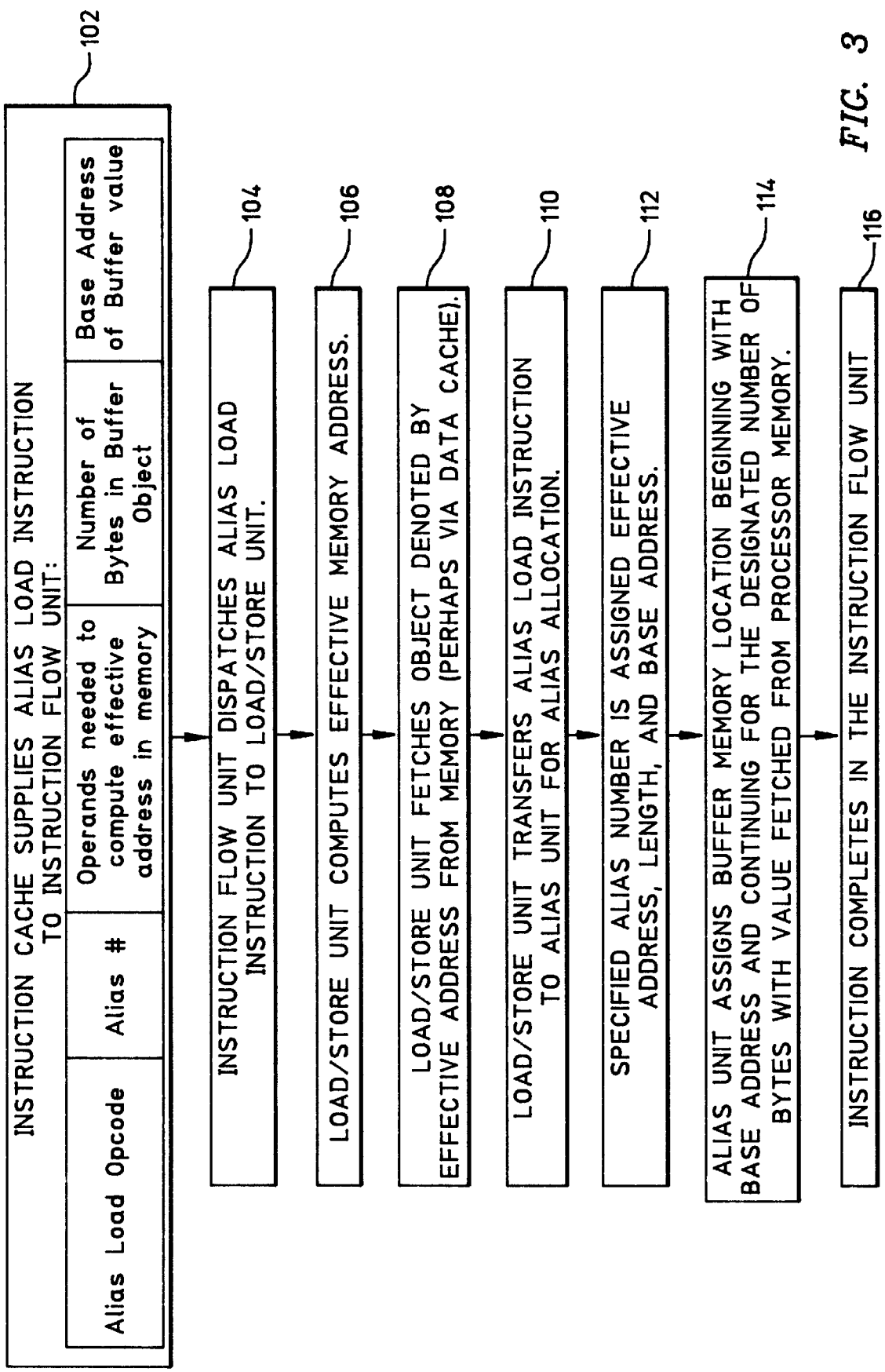
FIG. 3 is a flow diagram that illustrates the processing steps carried out in performing an allocate instruction for an alias entry and associated alias buffer memory in the alias unit illustrated in FIG. 2.

FIG. 3 illustrates the operating steps carried out by the processor 20 in executing an allocate and initialize (load) alias entry opcode. Such an instruction permits the processor to fetch a data object from the memory unit 24 and load it into the alias unit 30 at a sequence of storage locations specified by an associated alias entry. The allocation can be performed by a compiler utilizing the processor system 20 at compile time, in contrast to most intermediate storage allocations, which occur at run time. The processing begins when the instruction flow unit 42 receives a machine instruction with the alias load opcode from the instruction cache 40, as indicated by the flow diagram box numbered 102. An exemplary machine instruction is illustrated in FIG. 3, which shows that the instruction contains an alias load opcode field, an alias entry name (number) field, operands necessary to compute the effective address in the memory unit, the record size in number of bytes in the alias buffer memory, and the base address of the data object in the alias buffer memory. It should be understood that the sequence of instruction fields illustrated in FIG. 3 and in the following flow diagrams is arbitrary and that another sequence could be selected without departing from the teachings of the invention.

The next operating step, as indicated by the flow diagram box numbered 104, is for the instruction flow unit 42 to dispatch the alias load instruction to the load/store unit 48. The dispatch operation of the instruction flow unit should be well-known to those skilled in the art. In response, the load/store unit computes an effective memory address at box 106. The load/store unit then fetches the data object denoted by the computed effective address from either the memory unit 24 or from the data cache 28, in accordance with the processor design, as indicated by the flow diagram box numbered 108. The processing to perform the fetch should be well-known to those skilled in the art. The next processing step, indicated by the flow diagram box numbered 110, is for the load/store unit to send the alias load instruction with the fetched data to the alias unit for alias entry allocation.

In the processing step indicated by the flow diagram box numbered 112, the alias load instruction is received by the alias unit control logic 36, which will be referred to interchangeably as the alias unit controller or simply alias controller. In box 112, the alias unit controller stores the alias table entry at the specified alias entry index number with the effective address, byte length, and base address derived from the load instruction received in the step indicated by the box numbered 102. The next step is for the alias controller to assign the value fetched from the memory unit 24 or data cache 28 into the alias buffer memory storage locations beginning with the base address and continuing for the number of address locations designated by the record size in bytes contained in the machine instruction, as indicated by the flow diagram box numbered 114. Finally, the instruction execution completes with the return of a completion indication to the instruction flow unit 42, as indicated by the flow diagram box numbered 116. Thus, FIG. 3 shows how the table of alias entries 34 and buffer memory 32 are loaded.

Figure 4:
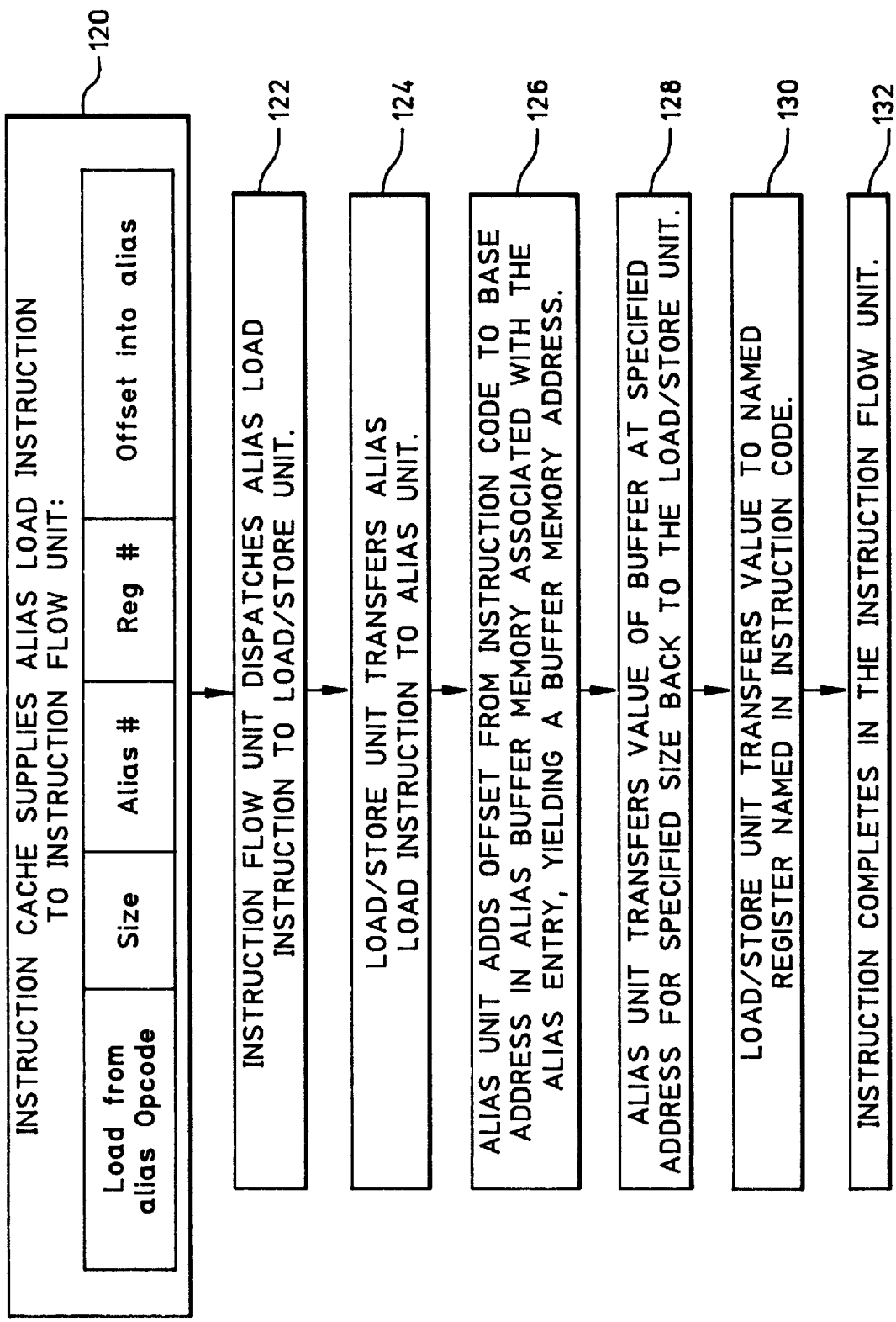
FIG. 4 is a flow diagram that illustrates the processing steps carried out in performing a load from explicit alias entry in the alias unit of FIG. 2 to a register.

FIG. 4 illustrates the operating steps carried out by the processor in executing a load opcode that loads an alias entry value in the alias buffer memory into one of the processor core registers 54, 56, 58 of FIG. 1. The processing begins when the instruction flow unit receives a machine instruction with the register load from alias register opcode from the instruction cache, as indicated by the flow diagram box numbered 120. The exemplary machine instruction illustrated in FIG. 4 shows instruction fields that include a register load from alias register opcode field, a size field, an alias entry name (number) field, a destination register name field, and an offset into the alias buffer memory. The offset permits a particular part of the data object associated with the alias entry to be selected.

The next operating step, as indicated by the flow diagram box numbered 122, is for the instruction flow unit to dispatch the load from alias register instruction to the load/store unit. In response, the load/store unit sends the instruction to the alias unit at box 124. The alias controller then adds the offset to the base address in the alias buffer memory associated with the specified alias name, yielding a buffer address, as indicated by the flow diagram box numbered 126. The next processing step, indicated by the flow diagram box numbered 128, is for the alias controller to transfer the value in the buffer at the specified address for the specified size back to the load/store unit.

When the load/store unit receives the data from the alias buffer memory, it transfers the value to the processor hardware register named in the instruction received in the flow diagram box numbered 120. This processing step is indicated in the flow diagram box numbered 130. Finally, the instruction execution completes with the return of a completion indication to the instruction flow unit, as indicated by the flow diagram box numbered 132.

Figure 5:
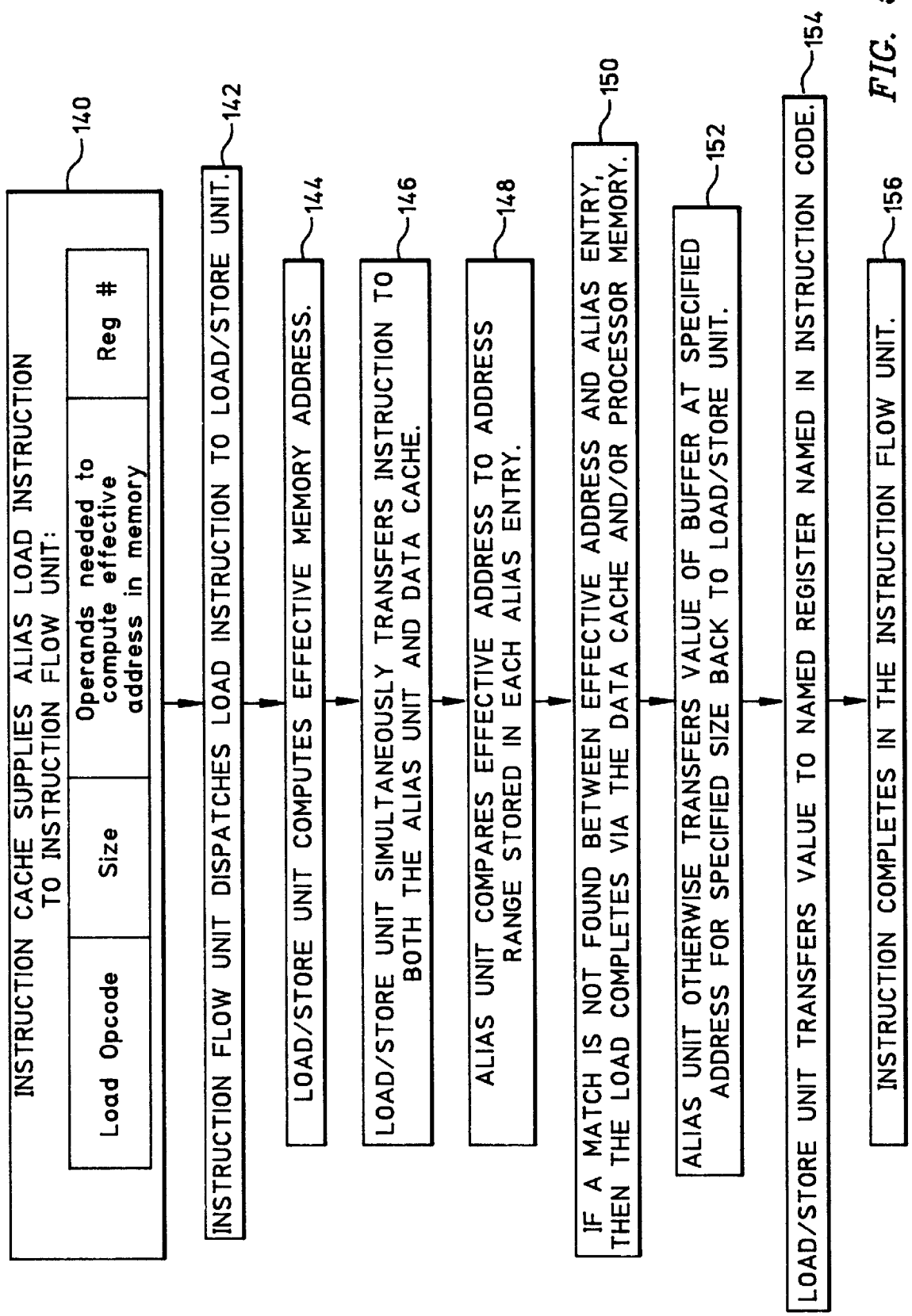
FIG. 5 is a flow diagram that illustrates the processing steps carried out in performing an implicit load from alias entry (denoted by an effective address) of the alias unit of FIG. 2 to a register.

FIG. 5 illustrates the operating steps carried out by the processor in executing a load opcode that loads a processor register with data from either the data cache or an alias entry using, an effective addressing scheme. The processing begins when the instruction flow unit receives a machine instruction with the effective addressing load instruction from the instruction cache, as indicated by the flow diagram box numbered 140. The exemplary machine instruction illustrated in FIG. 5 shows instruction fields that include a memory load opcode field, a size field, operands necessary to compute the effective address in processor memory, and a processor register name (number).

The next operating step, as indicated by the flow diagram box numbered 142, is for the instruction flow unit to dispatch the load instruction to the load/store unit. In response, the load/store unit computes an effective memory address at box 144. Next, as indicated by the flow diagram box numbered 146, the load/store unit simultaneously provides the machine instruction to both the data cache and the alias unit. At the alias unit, the machine instruction is received by the alias unit controller. The controller compares the effective address received from the load/store unit with the memory address ranges belonging to each of the alias entries, as indicated by the flow diagram box numbered 148. The controller knows the buffer memory address ranges from the alias entries.

If the alias unit controller does not find a match between the effective address and an alias entry, then the controller informs the data cache over the cache-alias unit bus and the load instruction completes from the data cache or processor memory, as indicated by the flow diagram box numbered 150. If the alias controller otherwise matches the effective address with an alias register entry, the controller informs the data cache over the cache-alias unit bus, and transfers the value of the alias buffer memory at the specified address for the specified size back to the load/store unit. This controller processing is indicated by the flow diagram box numbered 152.

When the load/store unit receives the data from the alias unit, it transfers the value to the processor register named in the instruction received in the flow diagram box numbered 140. This processing step is indicated in the flow diagram box numbered 154. Finally, the instruction execution completes with the return of a completion indication to the instruction flow unit, as indicated by the flow diagram box numbered 156.

Figure 6:
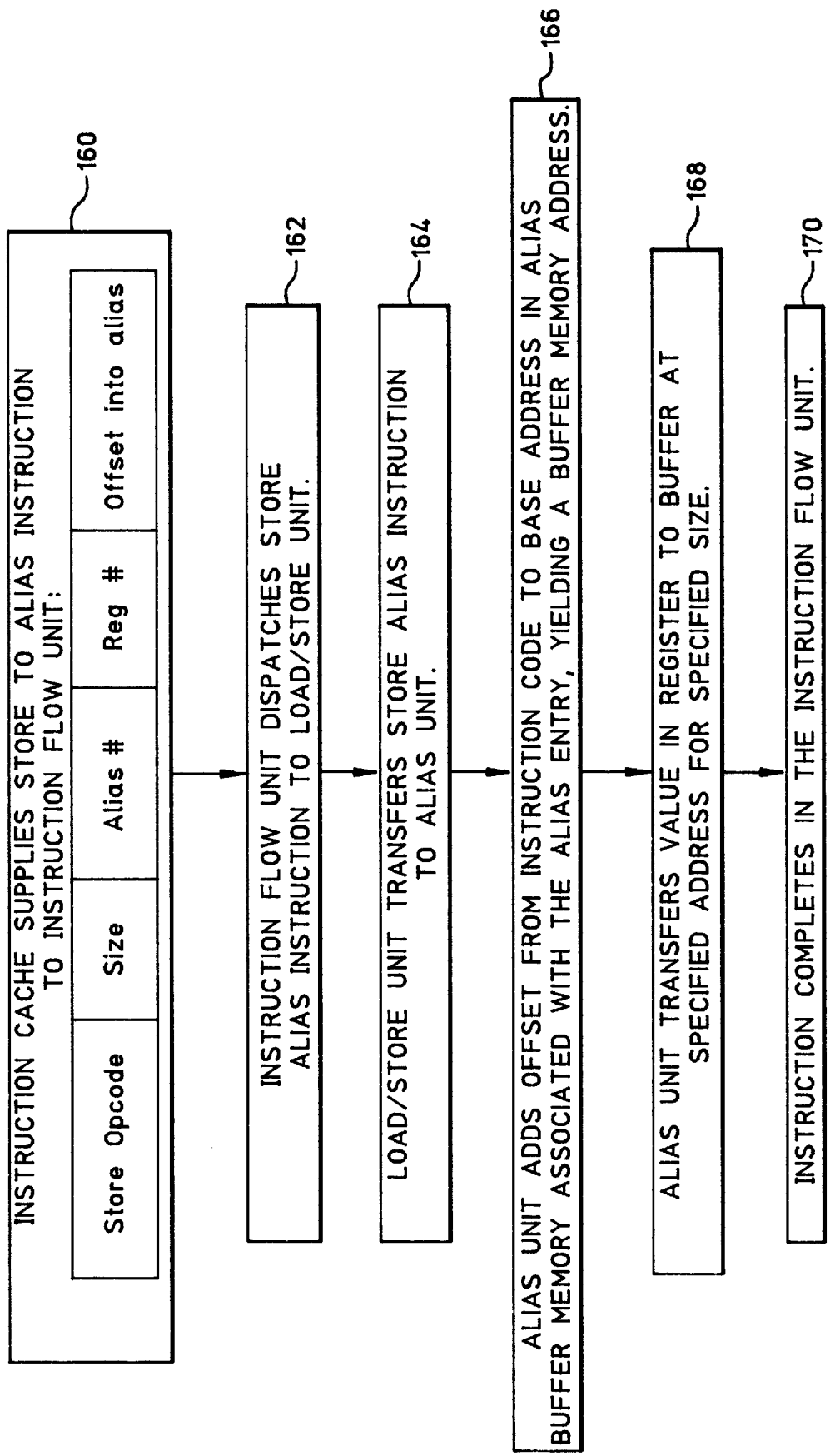
FIG. 6 is a flow diagram that illustrates the processing steps carried out in performing an explicit store from a register to an alias entry of the alias unit of FIG. 2.

FIG. 6 illustrates the operating steps carried out by the processor in executing a store register opcode that permits the processor to fetch a data object from a processor core (hardware) register and store it into an alias entry. The processing begins when the instruction flow unit receives a machine instruction with the store register opcode from the instruction cache, as indicated by the flow diagram box numbered 160. An exemplary machine instruction is illustrated in FIG. 6, which shows that the instruction includes a store register opcode field, a size field, an alias entry name (number) field, a processor register name (number) field, and an offset into the alias buffer memory.

The next operating step, as indicated by the flow diagram box numbered 162, is for the instruction flow unit to dispatch the store instruction to the load/store unit. In response, the load/store unit sends the store instruction to the alias unit, as indicated by the flow diagram box numbered 164. The instruction is received by the alias unit controller, which checks the destination processor register size against the size specified by the instruction.

The size checking process, which is common to all load and store opcodes that reference an explicit alias entry, is implemented as follows. If the sizes are not compatible, for example if the specified size from the alias entry is greater than the capacity of the processor core register, then the alias unit controller indicates an error to the instruction flow unit. If there is no such error, the controller adds the offset to the base address in the alias buffer memory locations associated with the specified alias entry name, yielding a buffer address. This processing is indicated by the flow diagram box numbered 166. In box 168, the alias controller transfers the value stored at the appropriate processor core register back to the load/store unit, which then loads the value into the buffer address for the specified size. The instruction execution completes with the return of a completion indication to the instruction flow unit, as indicated by the flow diagram box numbered 170.

Figure 7:
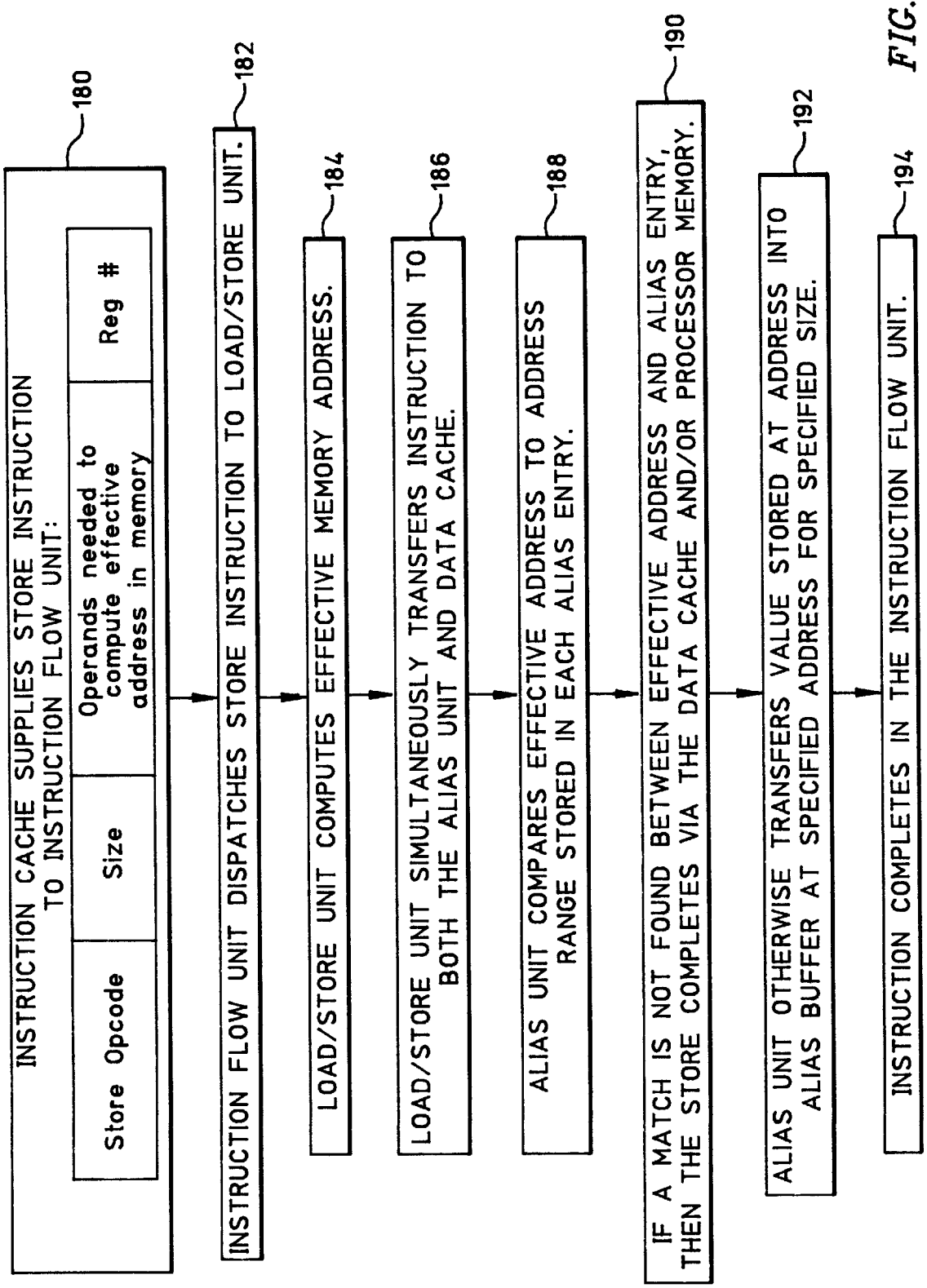
FIG. 7 is a flow diagram that illustrates the processing steps carried out in performing a store from a register to an implicit alias entry (denoted by an effective address) of the alias unit of FIG. 2.

FIG. 7 illustrates the operating steps carried out by the processor in executing a store from register opcode that stores a processor register data value into either the data cache or an alias table entry using an effective addressing scheme. The processing begins when the instruction flow unit receives a machine instruction with the store from register instruction from the instruction cache, as indicated by the flow diagram box numbered 180. The exemplary machine instruction illustrated in FIG. 7 shows instruction fields that include a store from register opcode field, a size field, operands necessary to compute the effective address in the memory unit, and a processor core register name (number) field.

The next operating step, as indicated by the flow diagram box numbered 182, is for the instruction flow unit to dispatch the store instruction to the load/store unit. In response, the load/store unit computes an effective memory address at box 184. Next, as indicated by the flow diagram box numbered 186, the load/store unit simultaneously provides the machine instruction to both the data cache and the alias unit. At the alias unit, the machine instruction is received by the alias controller. The controller compares the effective address received from the load/store unit with the range of alias buffer memory storage location addresses, as indicated by box 188, using the information from the specified alias entry.

If the alias controller does not find a match between the effective address and an alias entry, then the controller informs the data cache over the cache-alias unit bus and the store instruction completes from the data cache (or memory in the case of a cache miss), as indicated by the flow diagram box numbered 190. If the alias controller otherwise matches the effective address with an alias entry, then the controller informs the data cache over the cache-alias unit bus and transfers the value stored at the specified address into the alias buffer memory at the specified address for the specified size. This processing is indicated by the flow diagram box numbered 192. Finally, the instruction execution completes with the return of a completion indication to the instruction flow unit, as indicated by the flow diagram box numbered 194.

Figure 8:
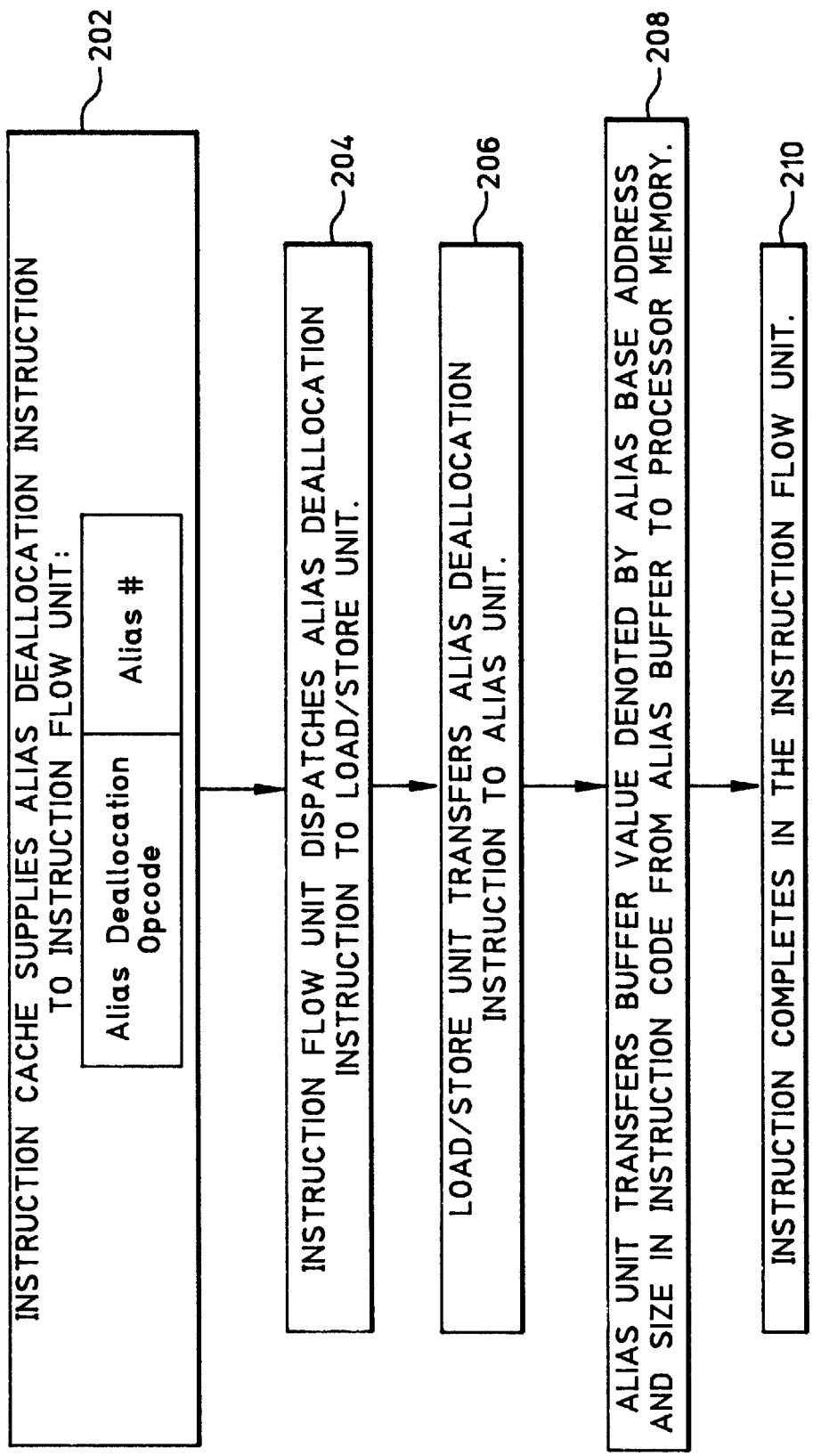
FIG. 8 is a flow diagram that illustrates the processing steps carried out in performing a deallocation instruction for an alias entry in the alias unit illustrated in FIG. 2.

FIG. 8 illustrates the operating steps carried out by the processor in executing a deallocation of alias entry opcode. Such an instruction permits the processor to deallocate, or empty, a data object specified from an alias entry base address. The processing begins when the instruction flow unit receives a machine instruction with the deallocate opcode from the instruction cache, as indicated by the flow diagram box numbered 202. An exemplary machine instruction is illustrated in FIG. 8, which shows that the deallocate instruction includes an alias deallocate opcode field and an alias entry name field.

The next operating step, as indicated by the flow diagram box numbered 204, is for the instruction flow unit to dispatch the alias deallocate instruction to the load/store unit. In response, the load/store unit transfers the alias deallocate instruction to the alias unit, as indicated by the flow diagram box numbered 206. In the next processing step, indicated by the flow diagram box numbered 208, the alias controller transfers the alias buffer memory value denoted by the specified alias entry base address and the specified size into the processor memory storage locations beginning with the base address and continuing for the designated number of bytes minus one. Finally, the instruction execution completes with the return of a completion indication to the instruction flow unit, as indicated by the flow diagram box numbered 210.

The processor described above permits machine instructions to efficiently reference particular subfields of interest in variable size data objects. The data objects are packed into the alias buffer memory by a compiler so that the amount of information in the buffer memory referenced by each alias entry is exactly the length of the data object stored. Thus, efficient use of the processor memory resources is increased. The alias unit thereby provides an efficient, high-speed intermediate storage for use by the compiler.

Figure 9:
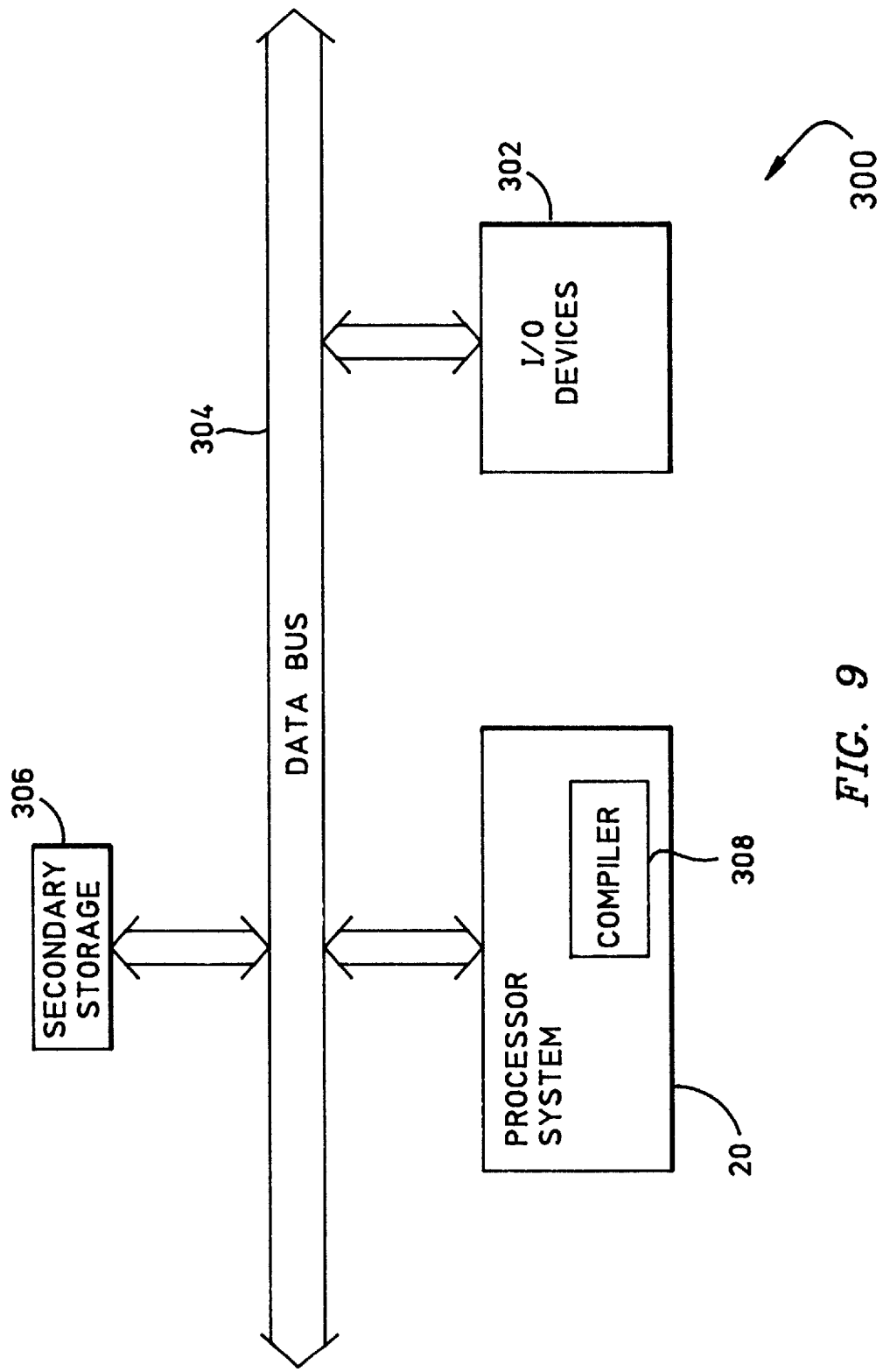
FIG. 9 is a block diagram of a computer system that includes the processor illustrated in FIG. 1.

The processor 20 can be installed in a computer having conventional input/output devices, such as a keyboard, display monitor, display mouse, printer, and the like. FIG. 9 shows a block diagram of a computer 300 that includes the processor 20 described above. The input/output devices are shown as a single block 302 connected to the processor 20 via a data bus 304. It should be appreciated that the input/output block devices comprise devices with which a human operator can control the operation of the processor. Also connected to the processor is secondary data storage 306, which can comprise devices such as magnetic disks, magneto-optical disks, magnetic tape, CD-ROM drives, and the like. The computer 300 can be used with an installed compiler 308, which is illustrated in the processor 20. Those skilled in the art will appreciate that a compiler is typically installed in a processor by occupying some portion of the main memory unit 24 illustrated in FIG. 1. Those skilled in the art will recognize that a compiler receives program language code directed from the input/output devices and performs a compile process to convert the language code to machine instructions. After the compiler completes the compilation process, the processor executes the machine instructions in a run time process. Using the machine instruction set of the processor 20 described above, the compiler 308 allocates variable length blocks of the alias buffer memory prior to run time.

In particular, the compiler 308 may provide the allocate instruction illustrated in FIG. 3 to designate blocks of the alias buffer memory 32 (FIG. 2) for data records of varying size, and can perform such allocation at compile time. Such compile-time allocation would permit greater efficiency in data record management and other optimizations. For example, the compiler 308 can implement commutation (also called context switching) between multiple processing threads at compile time as soon as the processor core 22 determines that all references made by a machine instruction can be satisfied by operands in registers or in the alias entries table 34. Without the alias unit 30, the context switching decision must be deferred until the data cache 28 determines that the desired memory location is or is not in the cache. Context switching would occur if the value is not in the cache. The early decision-making made possible by the processor 20 simplifies multiple-thread context switching and provides improved access by multiple processing threads to the same data objects.

Instead of being provided by a high-level language compiler during program conversion, those skilled in the art will appreciate that assembly- and machine-level routines can be written, entered, and compiled which embody the instructions illustrated in FIGS. 3–8. Such routines will implement the illustrated instructions, when executed in processors having the architecture illustrated in FIGS. 1 and 2.

The present invention has been described above in terms of a presently preferred embodiment so that an understanding of the present invention can be conveyed. There are, however, many configurations for computer processors not specifically described herein but with which the present invention is applicable. The present invention should therefore not be seen as limited to the particular embodiment described herein, but rather, it should be understood that the present invention has wide applicability with respect to computer processors generally. All modifications, variations, or equivalent arrangements that are within the scope of the attached claims should therefore be considered to be within the scope of the invention.

We claim:

1. A processor system comprising:
a processor core having circuitry that implements processor execution logic and supports instruction set architecture operation;
a memory unit having addressable storage locations in which the processor core stores data objects and from which the processor core retrieves data objects; and
an alias unit having an alias buffer memory with a plurality of storage locations, a table of alias entries that are indexed by an alias entry name and contain a memory unit address, a length value, and a base address pointer that identifies a storage location in the alias buffer memory, and control logic that reediness a machine instruction from the processor core for allocating storage locations in the alias buffer memory and in response enters a base address value contained in the machine instruction into an alias entry name contained in the machine instruction; wherein the control logic responds to a compiler-generated instruction to allocate and initialize an alias entry by storing a memory unit address storage location, byte length value, and alias buffer memory base address at an alias entry table index specified in the instruction at compiling run time and then storing a data record located at a beginning memory unit address storage location specified by the alias entry and continuing for the number of address locations specified in the byte length value into the alias buffer memory beginning at the base address and continuing for the number of address locations specified in the byte length value.

2. A processor system as defined in claim 1, wherein the control logic responds to a received machine instruction having a reference to a memory unit address storage location contained in the alias entry table by automatically redirecting the reference to the alias buffer memory value for the number of address locations specified in the corresponding alias entry.

3. A processor system as defined in claim 2, wherein the control logic responds to a received machine instruction to store or retrieve data in the alias buffer memory at a specified address by comparing the specified address against the memory unit address storage locations contained in the alias entry table and indicating a failed reference if the storage location is not found in the alias entry table.

4. A processor system as defined in claim 1, wherein a received machine instruction having an explicit reference to an alias entry table index name is automatically redirected by the alias control logic to the alias buffer memory value for the number of address locations specified in the corresponding alias entry.

5. A processor system as defined in claim 1, further including:
a data cache intermediate storage unit; and
a cache-alias unit bus over which the data cache and alias unit exchange information concerning their respective operation status; wherein:
the control logic responds to a received machine instruction to store a value using an effective addressing scheme by determining if an effective address computed from the machine instruction corresponds to a location in the alias buffer memory and informing the data cache of the determination outcome.

6. A processor system as defined in claim 1, wherein the control logic responds to a received machine instruction to load a destination processor core register with a value from the alias buffer memory beginning at a buffer memory base address and continuing to an ending address for a number of address locations specified in the machine instruction by comparing a predetermined destination register size with the specified number of address locations and providing an error indication if the length value specified in the machine instruction exceeds the size of the destination register.

7. A processor system as defined in claim 1, wherein the control logic responds to a received machine instruction to load a processor core register with a data record stored in the alias buffer memory by adding an offset value specified in the machine instruction to produce a buffer address and transfer the data record in the alias buffer memory beginning at the buffer address storage location and continuing for a number of address locations specified in a byte length value specified in the machine instruction.

8. A processor system as defined in claim 1, wherein the control logic responds to a received machine instruction to load a processor core register with a data record from either a data cache or the alias unit by determining if an effective address specified in the machine instruction corresponds to an alias buffer memory address storage location, informing a data cache of the determination, and transferring the data record to the processor core register if the effective address was determined to be in the alias buffer memory.

9. A processor system as defined in claim 1, wherein the control logic responds to a received machine instruction to store a data record from a processor core register into the alias unit by adding an offset value specified in the machine instruction to an alias buffer memory base address corresponding to the base address of an alias entry index specified by the machine instruction to produce a buffer address, and transferring the data record in the processor core register into the alias buffer memory beginning at the buffer address and continuing for the number of address locations specified in the machine instruction.

10. A processor system as defined in claim 1, wherein the control logic responds to a received machine instruction to store a data record from a processor core register into the alias unit by comparing an alias buffer memory address storage location specified in the machine instruction against the memory unit address storage locations contained in the alias entry table, indicating a failed reference if the storage location is not found in the alias entry table, and otherwise transferring the data record in the processor core register into the alias buffer memory beginning at the specified buffer address storage location and continuing for the number of address locations specified in the machine instruction.

11. A processor system as defined in claim 1, wherein the control logic responds to a received machine instruction to store a data record from the alias unit into the memory unit by transferring a data record, beginning at an alias buffer memory address storage location corresponding to the base address of an alias entry specified by the machine instruction and continuing for the number of address locations corresponding to the byte length of the alias entry, to the memory unit address storage location corresponding to the address of the alias entry and continuing for the number of address locations corresponding to the byte length.

12. A processor comprising:
a load/store unit that receives a machine instruction that specifies requested processor operations for execution;
a plurality of addressable hardware registers;
a memory unit having addressable storage locations in which data objects are stored and from which the data objects are retrieved;
an alias buffer memory with a plurality of storage locations;
a table of alias entries that are indexed by an alias entry name and contain (I) a memory unit address, (ii) a length value, and (iii) a base address pointer that identifies a storage location in the alias buffer memory; and
alias control logic that receives a compiler-generated instruction from the load/store unit for allocating storage locations in the alias buffer memory and in response enters a base address value contained in the instruction into an alias entry name contained in the instruction; wherein the alias control logic responds to a received machine instruction to allocate and initialize an alias entry by storing a memory unit address storage location, byte length value, and alias buffer memory base address at an alias entry table index specified in the received instruction at compiling run time and then storing a data record located at a beginning memory unit address storage location specified by the corresponding alias entry and continuing for the number of address locations specified in the byte length value into the alias buffer memory beginning at the base address and continuing for the number of address locations specified in the byte length value specified in the received machine instruction.

13. A processor as defined in claim 12, wherein the alias control logic responds to a received machine instruction having a reference to a memory unit address storage location contained in the alias entry table by automatically redirecting the reference to the alias buffer memory value for the number of address locations specified in the corresponding alias entry table.

14. A processor as defined in claim 13, wherein the alias control logic responds to a received machine instruction to store or retrieve data in the alias buffer memory at a specified address by comparing the specified address against the memory unit address storage locations contained in the alias entry table and indicating a failed reference if the storage location is not found in the alias entry table.

15. A processor as defined in claim 12, wherein a received machine instruction having an explicit reference to an alias entry table index name is automatically redirected by the alias control logic to the alias buffer memory value for the number of address locations specified in the corresponding alias entry.

16. A processor as defined in claim 12, further including:
a data cache intermediate storage unit; and
a cache-alias unit bus over which the data cache and alias control logic exchange information concerning their respective operation status; wherein:
the alias control logic responds to a received machine instruction to store a value using an effective addressing scheme by determining if an effective address computed from the machine instruction corresponds to a location in the alias buffer memory and informing the data cache of the determination outcome.

17. A processor as defined in claim 12, wherein the alias control logic responds to a received machine instruction to load a destination register with a value from the alias buffer memory beginning at a buffer memory base address and continuing to an ending address for a number of address locations specified in the machine instruction by comparing a predetermined destination register size with the specified number of address locations and providing an error indication if the length value specified in the machine instruction exceeds the size of the destination register.

18. A processor as defined in claim 12, wherein the alias control logic responds to a received machine instruction to load a register with a data record stored in the alias buffer memory by adding an offset value specified in the machine instruction to produce a buffer address and transfer the data record in the alias buffer memory beginning at the buffer address storage location and continuing for a number of address locations specified in a byte length value specified in the received machine instruction.

19. A processor as defined in claim 12, wherein the alias control logic responds to a received machine instruction to load a register with a data record from either a data cache or the alias buffer memory by determining if an effective address specified in the machine instruction corresponds to an alias buffer memory address storage location, informing a data cache of the determination, and transferring the data record to the register if the effective address was determined to be in the alias buffer memory.

20. A processor as defined in claim 12, wherein the alias control logic responds to a received machine instruction to store a data record from a register into the alias buffer memory by adding an offset value specified in the machine instruction to an alias buffer memory base address corresponding to the base address of an alias entry index specified by the instruction to produce a buffer address, and transferring the data record in the register into the alias buffer memory beginning at the buffer address and continuing for the number of address locations specified in the received machine instruction.

21. A processor as defined in claim 12, wherein the alias control logic responds to a received machine instruction to store a data record from a register into the alias buffer memory by comparing an alias buffer memory address storage location specified in the machine instruction against the memory unit address storage locations contained in the alias entry table, indicating a failed reference if the storage location is not found in the alias entry table, and otherwise transferring the data record in the register into the alias buffer memory beginning at the specified buffer address storage location and continuing for the number of address locations specified in the machine instruction.

22. A processor as defined in claim 12, wherein the alias control logic responds to a received machine instruction to store a data record from the alias buffer memory into the memory unit by transferring a data record, beginning at an alias buffer memory address storage location corresponding to the base address of an alias entry specified by the machine instruction and continuing for the number of address locations corresponding to the byte length of the alias entry, to the memory unit address storage location corresponding to the address of the alias entry and continuing for the number of address locations corresponding to the byte length.

23. A method of performing machine instructions with a processor having circuitry that implements processor execution logic and a memory unit having addressable storage locations in which data objects are stored and from which the data objects are retrieved, the method comprising the steps of:
   receiving a compiler-generated instruction for allocating storage locations in an alias buffer memory of the processor that includes a plurality of storage locations;
   entering a base address value contained in the machine instruction into a table of alias entries that are indexed by an alias entry name, thereby identifying a group of alias buffer memory locations associated with the alias entry name beginning at the base address value and continuing for a number of buffer memory address locations that are specified in the machine instruction and associated with the alias entry name;
   wherein the step of receiving a instruction further comprises responding to a received instruction to allocate and initialize an alias entry by storing a memory unit address storage location, byte length value, and alias buffer memory base address at an alias entry table index specified in the instruction at compiling run time and then storing a data record located at a beginning memory unit address storage location specified by the alias entry and continuing for the number of address locations specified in the byte length value into the alias buffer memory beginning at the base address and continuing for the number of address locations specified in the byte length value.

24. A method as defined in claim 23, further including the step of responding to a received machine instruction having a reference to a memory unit address storage location contained in the alias entry table by automatically redirecting the reference to the alias buffer memory value for the number of address locations specified in the associated alias entry.

25. A method as defined in claim 24, further including the step of responding to a received machine instruction to store or retrieve data in the alias buffer memory at an address specified in the machine instruction by comparing the specified address against the memory unit address storage locations contained in the alias entry table and indicating a failed reference if the storage location is not found in the alias entry table.

26. A method as defined in claim 23, further including the step of responding to a received machine instruction having an explicit reference to an alias entry table index name by automatically redirecting the reference to the alias buffer memory value for the number of address locations specified in the associated alias entry.

27. A method as defined in claim 23, wherein the processor further includes a data cache intermediate storage unit and a cache-alias unit bus over which the data cache and alias unit exchange information concerning their respective operation status; the method further including the step of:
   responding to a received machine instruction to store a value using an effective addressing scheme by determining if an effective address computed from the machine instruction corresponds to a location in the alias buffer memory and informing the data cache of the determination outcome.

28. A method as defined in claim 23, further including the step of responding to a received machine instruction to load a destination register with a value from the alias buffer memory beginning at a buffer memory base address and continuing to an ending address for a number of address locations specified in the machine instruction by comparing a predetermined destination register size with the specified number of address locations and providing an error indication if the length value specified in the machine instruction exceeds the size of the destination register.

29. A method as defined in claim 23, further including the step of responding to a received machine instruction to load a register with a data record stored in the alias buffer memory by adding an offset value specified in the machine instruction to produce a buffer address and transfer the data record in the alias buffer memory beginning at the buffer address storage location and continuing for a number of address locations specified in a byte length value specified in the machine instruction.

30. A method as defined in claim 23, further including the step of responding to a received machine instruction to load a register with a data record from either a data cache or the alias unit by determining if an effective address specified in the machine instruction corresponds to an alias buffer memory address storage location, informing a data cache of the determination, and transferring the data record to the register if the effective address was determined to be in the alias buffer memory.

31. A method as defined in claim 23, further including the step of responding to a received machine instruction to store a data record from a register into the alias buffer memory by adding an offset value specified in the machine instruction to an alias buffer memory base address corresponding to the base address of an alias entry index specified by the machine instruction to produce a buffer address, and transferring the data record in the register into the alias buffer memory beginning at the buffer address and continuing for the number of address locations specified in the machine instruction.

32. A method as defined in claim 23, further including the step of responding to a received machine instruction to store a data record from a register into the alias buffer memory by comparing an alias buffer memory address storage location specified in the machine instruction against the memory unit address storage locations contained in the alias entry table, indicating a failed reference if the storage location is not found in the alias entry table, and otherwise transferring the data record in the register into the alias buffer memory beginning at the specified buffer address storage location and continuing for the number of address locations specified in the machine instruction.

33. A method as defined in claim 23, further including the step of responding to a received machine instruction to store a data record from the alias buffer memory into the memory unit by transferring a data record, beginning at an alias buffer memory address storage location corresponding to the base address of an alias entry specified by the machine instruction and continuing for the number of address locations corresponding to the byte length of the alias entry, to the memory unit address storage location corresponding to the address of the alias entry and continuing for the number of address locations corresponding to the byte length.

34. A computer system comprising:
   a processor having
      a processor core having circuitry that implements processor execution logic and supports instruction set architecture operation,
      a memory unit having addressable storage locations in which the processor core stores data objects and from which the processor core retrieves data objects, and
      an alias unit having an alias buffer memory with a plurality of storage locations, a table of alias entries that are indexed by an alias entry name and contain a memory unit address, a length value, and a base address pointer that identifies a storage location in the alias buffer memory, and control logic that receives a compiler-generated instruction from the processor core for allocating storage locations in the alias buffer memory and in response enters a base address value contained in the instruction at compiling run time into an alias entry name contained in the instruction;
   an input/output block including one or more devices with which a human operator can control the operation of the processor;
   secondary storage in which data is stored and retrieved from;
   a data bus over which the processor communicates with the input/output block and secondary storage; and
   a compiler that receives program language code and performs a compile time process to convert it to alias unit instructions prior to executing the converted program language code in a run time process, and allocates variable length blocks of the alias buffer memory prior to run time.

35. A computer system as defined in claim 34, wherein the alias unit control logic responds to a received compiler-generated machine instruction having a reference to a memory unit address storage location contained in the alias entry table by automatically redirecting the reference to the alias buffer memory value for the number of address locations specified in the corresponding alias entry.

36. A computer system as defined in claim 35, wherein the alias unit control logic responds to a received compiler-generated machine instruction to store or retrieve data in the alias buffer memory at a specified address by comparing the specified address against the memory unit address storage locations contained in the alias entry table and indicating a failed reference if the storage location is not found in the alias entry table.

37. A computer system as defined in claim 35, wherein the alias unit control logic responds to a received compiler-generated machine instruction having an explicit reference to an alias entry table index name by automatically redirecting the reference to the alias buffer memory value for the number of address locations specified in the corresponding alias entry.

* * * * *

UNITED STATES PATENT AND TRADEMARK OFFICE
CERTIFICATE OF CORRECTION

PATENT NO. : 5,860,138
DATED : Jan. 12, 1999
INVENTOR(S) : Engebretsen et al.

It is certified that error appears in the above-identified patent and that said Letters Patent is hereby corrected as shown below:

Claim 1, Col. 11, Line 58, "reediness" should be --receives--.

Claim 6, Col. 12, Line 48, "comprising" should be --comparing--.

Signed and Sealed this

First Day of June, 1999

*Attest:*

Q. TODD DICKINSON

*Attesting Officer*  *Acting Commissioner of Patents and Trademarks*